United States Patent [19]

Merry

[11] Patent Number: 4,489,969
[45] Date of Patent: Dec. 25, 1984

[54] CLAM DIGGING TOOL

[76] Inventor: Clayton Merry, Star Rte., Box 48, Leavenworth, Wash. 98826

[21] Appl. No.: 428,723

[22] Filed: Sep. 30, 1982

[51] Int. Cl.³ .............................................. A01B 1/18
[52] U.S. Cl. ................................................ 294/50.8
[58] Field of Search .................... 294/50.8, 50.6, 50.7, 294/50.5, 50; 73/425, 425.2; 172/22; 37/55, 119; 30/316

[56] References Cited

U.S. PATENT DOCUMENTS 437,466  9/1890  Vogel ................................. 294/50.8
3,089,721  5/1963  Puckett ............................. 294/50.7

Primary Examiner—James B. Marbert
Attorney, Agent, or Firm—Seed and Berry

[57] ABSTRACT

The present invention relates to a digging tool comprising a plurality of pivotally interconnected shovel segments which define a generally cylindrical boring means. Each segment includes a nose for penetrating into the sand surrounding a clam, a butt laterally opposite the nose, and a pair of spaced ears on opposite sides of the segment for pivotally connecting the segment with the other segments of the tool by overlapping respective ears and pinning the ears with suitable hinge pins. Handles are connected to the shovel segments to extend upwardly from the butt end and to allow the exertion of a downwardly directed force on the segments so that the segments will penetrate, nose first, into the sand around a clam, and for allowing an inwardly directed force to be exerted on the sand through the segments so that the sand and clam can be removed upon withdrawal of the tool from the sand.

14 Claims, 4 Drawing Figures

U.S. Patent    Dec. 25, 1984    4,489,969
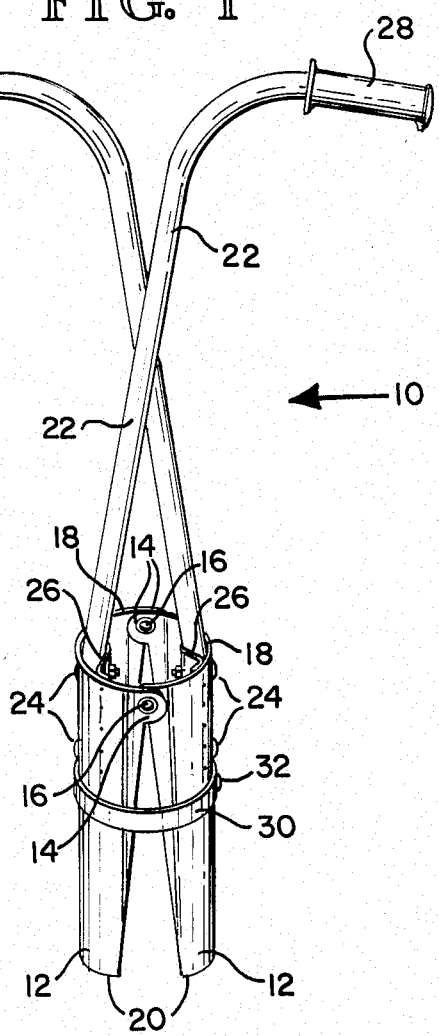
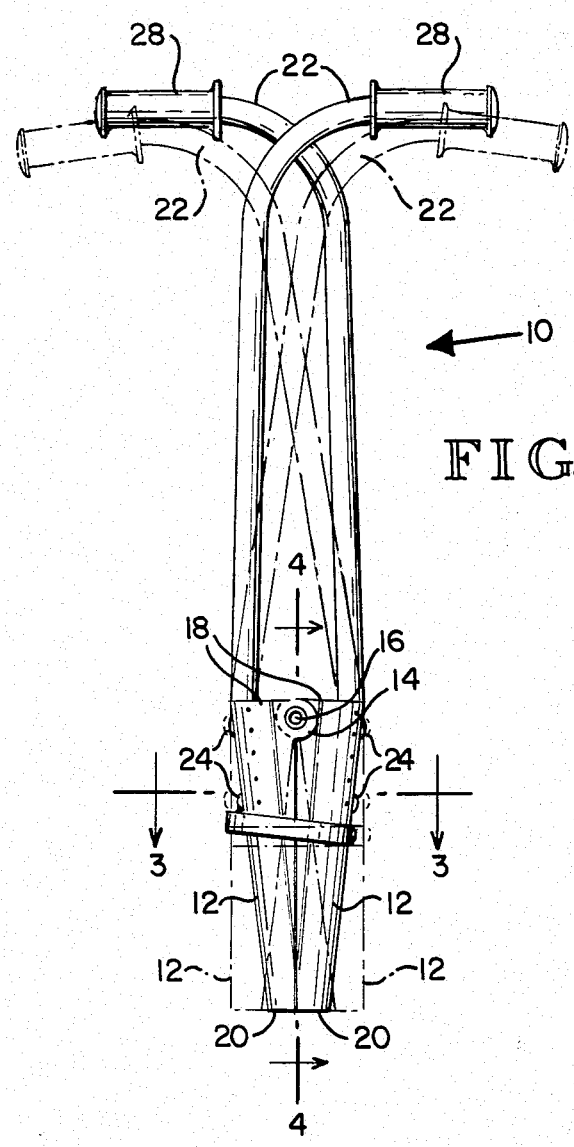
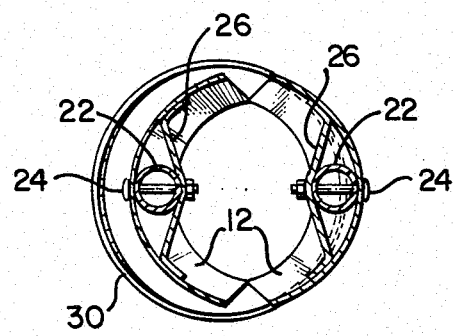

CLAM DIGGING TOOL

DESCRIPTION

1. Technical Field

The present invention relates to digging tools, and more particularly, to a tool for digging razor clams from wet tidal sands.

2. Background Art

To dig razor clams, individuals will ordinarily use methods which greatly disrupt the tidal clam beds. For example, clam digging rakes or shovels may be used to excavate the wet sand. Alternatively, tubes may be sunk in the sand to capture clams within the sand which is extracted upon removal of the cylinder from the sand. Unfortunately, these methods often lead to needless damage to the clams. The clam rake, shovel, or tube often breaks surrounding clam shells. Clam diggers usually leave these broken clams on the shore, and thus contribute to pollution of the beaches.

DISCLOSURE OF INVENTION

An improved clam digging tool promotes quick, dependable, efficient digging of clams with a lightweight, durable tool. Use of the tool results in less damage to the clam beds and, particularly, less breakage of neighboring clams while extracting a clam with its surrounding sand. Generally, the clam digging tool of this invention comprises a plurality of pivotally interconneted shovel segments which are connected to define a generally cylindrical boring means. The tool is sunk into wet sand, nose first. Once sunk to the desired depth, the noses of the shovel segments are pivoted inwardly relative to one another to form a slightly conical shape which consolidates the sand within the bore and which allows extraction of the sand in a substantially uniform mass. That is, the inwardly directed force exerted on the sand through the shovel segments alters the generally cylindrical shape of the tool into a slightly conical shape which allows extraction of the encircled sand and clam. Preferably, the shovel segments have trapezoidal shapes so that their interconnection necessarily creates spaced, cutaway portions in the cylinder. The cutaway portions are usually centered about 180 degrees apart and reduce the area exposed to the blunt nose of the shovel segments. Thereby, the tool reduces breakage of clams which are not centered within the cylinder. Off-center clams are often undisturbed or are moved along the tapered edges of the shovel segments to enter the cylindrical bore of the tool without breaking. Markedly improved results in clam digging, particularly for razor clams, have been achieved by using the preferred clam digging tool of this invention.

BRIEF DESCRIPTION OF THE DRAWINGS

FIG. 1 is an isometric view of a clam digging tool of this invention.

FIG. 2 is a schematic illustration of operation of the clam digging tool of this invention, exaggerated to show movement of the handles after penetration of the shovel segments into sand.

FIG. 3 is a sectional view taken along line 3—3 of FIG. 2.

FIG. 4 is a sectional view taken along line 4—4 of FIG. 2.

BEST MODE FOR CARRYING OUT THE INVENTION

A clam digging tool 10 of this invention preferably has two arched shovel blades 12 which are pivotally interconnected by hinge pins 16 passing through overlapping ears 14. Each blade 12 is generally trapezoidal in shape if laid flat, and the ears 14 extend laterally from the top of the sloped edges adjoining the major base of the trapezoid. The minor base of the trapezoid forms a soil penetration nose 20. Each shovel segment 12 is curved in a generally semicircular manner so that, upon pivotal interconnection, the shovel segments 12 generally define a cylindrical volume. The trapezoidal shape of the shovel segments necessarily creates cutaway portions which are spaced apart around the edges of the cylinder. The blunt noses 20 of the shovel segments 12 are designed to penetrate the wet sand of clam beds much like a spade would penetrate soil in home gardening.

A respective handle 22 is connected at its lower end to each blade 12 by bolts 24 which pass through the blade, the handle, and an inner buttress web 26 welded at its ends to the inside surface of the shovel segment 12. The webs 26 are arched toward one another to complement the arching of the blades to provide tubular cavities to receive the handles, and, together with the handles, reinforce the blades. Each handle 22 is generally an inverted L-shaped tube, preferably of aluminum, which projects upwardly from the blades 12. The L-shaped ends of the handles 22 extend substantially perpendicular to the longitudinal axis of the handle 22 in a direction substantially perpendicular to a plane bisecting the tool 10 through the hinge pins 16. Each handle 22 ends with a rubber grip 28.

To avoid undue outward pivoting of the two blades 12 relative to one another, a strap 30 has overlapping ends secured with a bolt 32 at the outside of one of the blades and encircles the other blade. The endless strap 30 acts as a stop to check outward pivoting of the shovel segments 12 relative to one another. Thus, in their fully extended positions, the shovel segments 12 define a substantially cylindrical volume when rested on their blunt noses 20.

To dig clams, a downwardly directed force is exerted on the handles 22 while gripping the rubberized grips 28. The downwardly directed force forces the shovel segments 12 to penetrate, nose first, into the sand around a clam. Once inserted to the desired depth, the downwardly directed force is removed, and an inwardly directed force is exerted onto the sand through the shovel segments 12 by moving the handles inwardly with respect to one another, as illustrated in the exaggerated view of FIG. 2. The sand will resist the inward movement of the shovel segments 12, but, in any event, the generally cylindrical shape of the fully extended boring means will be transformed into a slightly conical shape which is better designed for removing the sand between the segments 12 by pulling upwardly on the handles 22. Because the sand is wet when digging clams, the inwardly directed force transmitted through the shovel segments 12 will consolidate the sand into a generally uniform mass.

Although the invention has been discussed with reference to digging razor clams, the tool has other digging uses, such as, for example, to transplant plants. When so used, the plant and surrounding dirt can be lifted free of the surrounding soil and lowered into a hole at another site which has been dug previously by use of the tool.

I claim:

1. A clam digging tool for removing a clam and sand surrounding the clam from clam beds, comprising:
   (a) a plurality of pivotally interconnected shovel segments defining a generally circular boring means, each segment including:
      (i) a nose for penetrating into the sand;
      (ii) a butt laterally opposite the nose; and
      (iii) a pair of spaced ears on opposite sides of segment for pivotally connecting the segment with the other segments by overlapping respective ears;
   (b) means for allowing a downwardly directed force to be exerted on the segments so that the segments penetrate, nose first, into the sand around a clam and for allowing an inwardly directed force to be exerted on the sand through the segments so that the sand and clam can be removed when withdrawing the tool from the sand; and
   (c) an endless belt attached to one segment between the nose and the butt and encircling the segments to define a stop against outward pivoting of the segments.

2. The clam digging tool of claim 1 wherein the means for allowing a downwardly directed force and for allowing an inwardly directed force is a handle for each segment mounted to each segment and projecting upwardly from the butt of each segment.

3. A clam digging tool for removing a clam and sand surrounding the clam from clam beds, comprising:
   (a) a pair of pivotally interconnected shovel blades defining a generally circular boring means, each segment including:
      (i) a nose for penetrating into the sand;
      (ii) a butt longitudinally opposite the nose; and
      (iii) a pair of spaced ears on opposite sides of the segment for pivotally connecting the segment with the other segment by overlapping respective ears;
   (b) a handle for each segment mounted to each segment and projecting upwardly from the butt of each segment for allowing a downwardly directed force to be exerted on the segments so that the segments penetrate, nose first, into the sand around a clam and for allowing an inwardly directed force to be exerted on the sand through the segments so that the sand and the clam can be removed when the tool is withdrawn from the sand; and
   (c) an endless belt attached to one segment at a predetermined point between the nose and the butt and encircling the other segment to define a stop against outward pivoting of the segments.

4. The clam digging tool of claim 3 wherein each segment has a blunt nose like a spade.

5. The clam digging tool of claim 4 wherein each segment is formed from a substantially trapezoidal sheet of metal having the blunt nose as a minor base and the butt as a major base.

6. The clam digging tool of claim 5 wherein each segment is curved about an axis substantially perpendicular to the bases of the trapezoid into a generally semicircular arc and wherein each ear of the segment projects from a side of the trapezoid substantially tangential to the circle defined by the segment.

7. The clam digging tool of claim 6 wherein each handle is attached to an inside face of the segment and is generally L-shaped.

8. The clam digging tool of claim 7 wherein the handles for the two segments cross and wherein the handles are bent in an "L" to project substantially perpendicular to a plane bisecting the tool and passing through the overlapping ears of the segments.

9. The clam digging tool of claim 7 wherein a reinforcing stock buttress is used to attach each handle to the respective segment.

10. A digging tool, comprising:
    (a) two pivotally interconnected shovel segments defining a generally circular boring means, each segment including:
       (i) a nose for penetrating into the earth;
       (ii) a butt laterally opposite the nose; and
       (iii) a pair of spaced ears on opposite sides of the segment for pivotally connecting the segment with the other segments by overlapping respective ears; and
    (b) handle means for allowing a downwardly directed force to be exerted on the segments so that the segments penetrate, nose first, into the earth and for allowing an inwardly directed force to be exerted on the earth through the segments so that the earth can be removed when withdrawing the tool; and
    (c) restraining means associated with the segments for limiting the outward pivoting of the segments, so that, when fully pivoted outwardly, the segments define a generally cylindrical volume.

11. The tool of claim 10 wherein the restraining means includes an endless belt attached to one segment between the nose and the butt and encircling the segments.

12. The tool of claim 10 wherein said handle means comprises two crossing generally L-shaped handles connected to respective of the segments.

13. The tool of claim 12 wherein a reinforcing stock buttress is used to attach each handle to the respective segment.

14. A claim digging tool for removing a clam and sand surrounding the clam from clam beds, comprising:
    (a) a pair of pivotally interconnected shovel blades defining a generally circular boring means, each segment including:
       (i) a nose for penetrating into the sand;
       (ii) a butt longitudinally opposite the nose; and
       (iii) a pair of spaced ears on opposite sides of the segment for pivotally connecting the segment with the other segment by overlapping respective ears;
    (b) a handle for each segment mounted to each segment and projecting upwardly from the butt of each segment for allowing a downwardly directed force to be exerted on the segments so that the segments penetrate, nose first, into the sand around a clam and for allowing an inwardly directed force to be exerted on the sand through the segments so that the sand and the clam can be removed when the tool is withdrawn from the sand; and
    (c) restraining means associated with the segments for limiting the outward pivoting of the segments responsive to downward force applied to the handles so that, when fully pivoted outwardly, the segments define a generally cylindrical volume.

* * * * *